(12) United States Patent
Altieri et al.

(10) Patent No.: US 6,322,213 B1
(45) Date of Patent: Nov. 27, 2001

(54) PROGRESSIVE MULTIFOCAL CONTACT LENS SUITABLE FOR COMPENSATING PRESBYOPIA

(75) Inventors: Andrea Altieri; Alessandro Filippo, both of Staranzano (IT)

(73) Assignee: Euro Lens Technology S.p.A., Staranzano (IT)

( * ) Notice: Subject to any disclaimer, the term of this patent is extended or adjusted under 35 U.S.C. 154(b) by 0 days.

(21) Appl. No.: 09/601,657
(22) PCT Filed: Feb. 3, 1999
(86) PCT No.: PCT/EP99/00708
  § 371 Date: Aug. 4, 2000
  § 102(e) Date: Aug. 4, 2000
(87) PCT Pub. No.: WO99/41633
  PCT Pub. Date: Aug. 19, 1999

(30) Foreign Application Priority Data

Feb. 11, 1998 (EP) .................................................. 98830059

(51) Int. Cl.[7] ..................................................... G02C 7/04
(52) U.S. Cl. ............................................................ 351/161
(58) Field of Search ............................... 351/161, 160 R, 351/160 H, 162

(56) References Cited

U.S. PATENT DOCUMENTS

| 4,976,534 | 12/1990 | Miege et al. ........................ 351/161 |
| 5,024,517 | * 6/1991 | Seidner ................................ 351/161 |
| 5,112,351 | * 5/1992 | Christie et al. ..................... 623/6.28 |
| 5,530,491 | 6/1996 | Baude et al. ........................ 351/169 |
| 5,682,223 | 10/1997 | Menezes et al. ................... 623/6.28 |
| 5,691,797 | 11/1997 | Seidner et al. ..................... 351/161 |
| 6,221,105 | * 4/2001 | Portney .............................. 623/5.11 |

FOREIGN PATENT DOCUMENTS

| 0 822 439 A1 | 2/1998 | (EP) . |
| 2 288 033 A | 10/1995 | (GB) . |

* cited by examiner

Primary Examiner—Jordan M. Schwartz
(74) Attorney, Agent, or Firm—Wenderoth, Lind & Ponack, L.L.P.

(57) ABSTRACT

The progression of the optical power of the lens comprises a first tract (a) that descends rapidly to the base dioptric power and in which the lens functions for near vision; a short second tract (b) that remains substantially at the level of the base dioptric power and in which the lens functions for far vision; and a third tract (c) consisting of a first progressively rising part (c') and a constant second part (c") and in which the lens functions progressively for intermediate distance in the first part and in a constant manner for near vision in the second part.

2 Claims, 3 Drawing Sheets

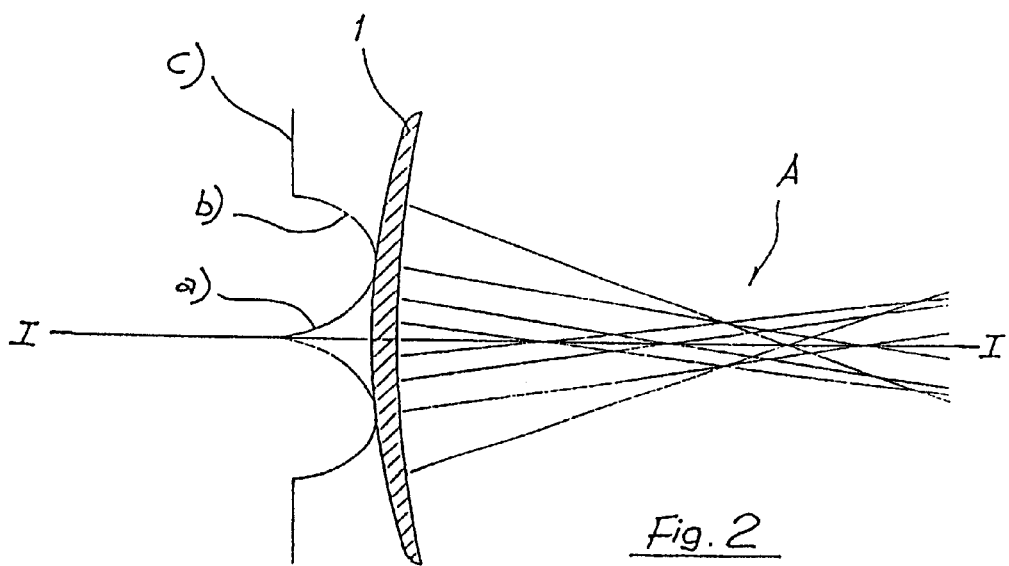

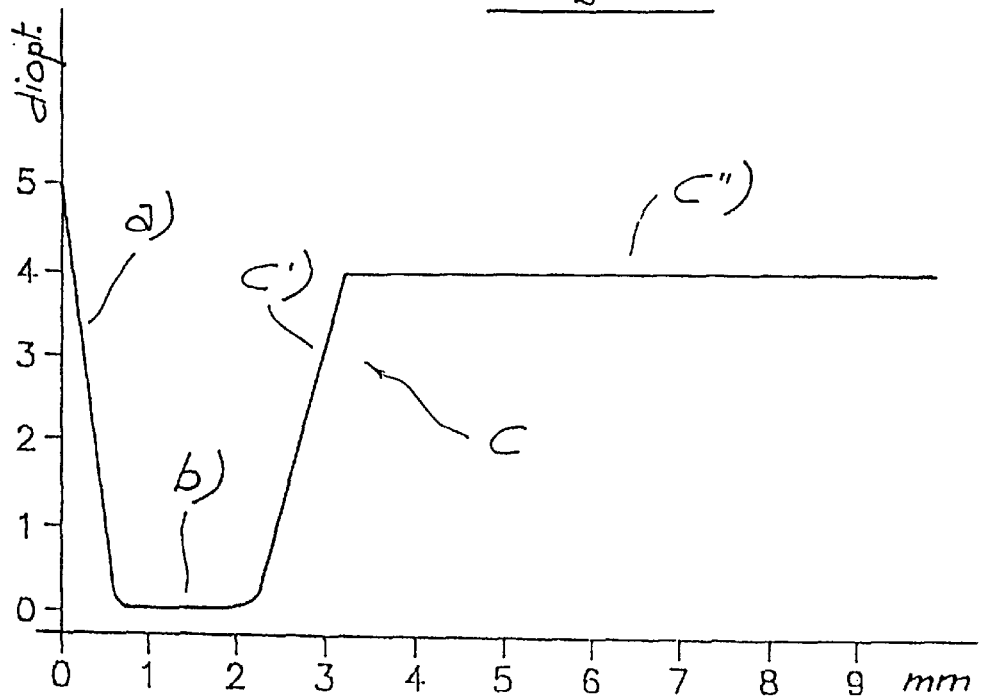
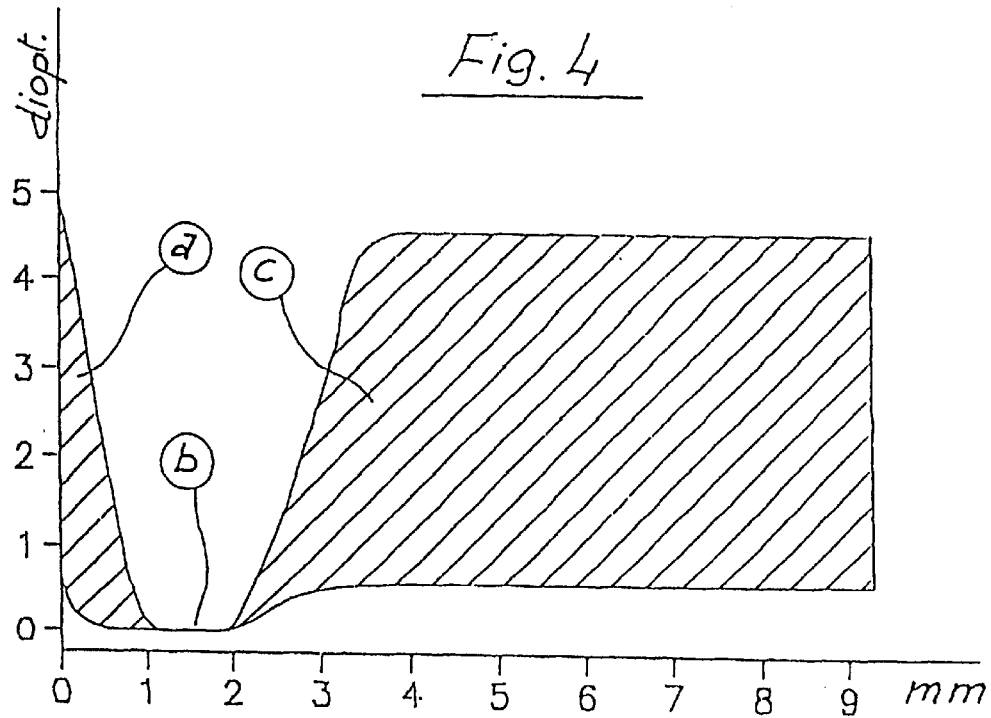

PROGRESSIVE MULTIFOCAL CONTACT LENS SUITABLE FOR COMPENSATING PRESBYOPIA

BACKGROUND OF THE INVENTION

The present invention relates to a progressive multifocal contact lens suitable for compensating presbyopia or, more generally, an ametropia associated with presbyopia.

The state-of-the-art multifocal contact lenses for the purposes set out above comprise physically defined optical zones for generating a double focalization of a single object.

In particular, GB 2288033 A reveals a contact lens for correcting presbyopia in which the central part is aspherical and corrects the near vision, while the peripheral annular part is spherical and corrects the far vision, where the aspherical part is multifocal, while the spherical part has a single focus.

The principal drawback of the known lenses is that a sufficiently valid vision is obtained only if and when the lens achieves and maintains adequate dynamics, that is to say, an adequate movement on the surface of the cornea. But even when this result is obtained, it will be accompanied by a fractionation of the radiant energy flux, which is effectively divided by the two areas of different dioptric power with a consequent loss of visual capacity of the wearer of the lens as regards mesoptic and nocturnal vision.

SUMMARY OF THE INVENTION

A long series of experiments has led to the present invention, which is capable of obviating these drawbacks and providing advantages that will be explained in due course. The invention is a progressive multifocal contact lens that makes the optical power vary with respect to the base dioptric power from the centre to the periphery of the entire optical zone, the power variation being such that it first diminishes, then remains constant and eventually rises again; this lens is capable of compensating the optical effect of presbyopia or other anomalies of the accommodation system.

The inventors deem that the new and unforseeable results obtained by their experiments could find explanation in the capacity of the combined system constituted by the eye and the brain of selecting the most suitable focal point for furnishing a clear perception of what the viewer wants to see within the scenario that engages his attention. Starting from what is currently known about the image perception mechanism, the inventors have- as it were- followed the path of the light rays backwards from the retina to the external surface of the contact lenses. It was simulated with the help of a computer and, using software specially created for this purpose, the optical zone of the contact lens was then processed and re-elaborated to define an uninterrupted bundle of clearly perceptible focal zones; this led to the construction of a rather complex surface, but which furnishes a far vision exactly equal to that of a normal monofocal contact lens and an excellent vision at both intermediate distances (desk, computer)and near distances (books, wristwatch, etc.)

The present description employs a number of terms that are to be conventionally understood as having the following meanings:

(i)—lens—stands for contact lens;

(ii)—internal—and—external—, when referred to the surfaces or the profiles of a lens, stand respectively for the side in contact with the eye and the side facing away from it;

(iii)—progression—indicates the fundamental characteristic of the invention: it is the function according to which the optical power of the lens varies with the distance from the centre and right through to the periphery of the lens;

(iv)—profile—of the lens is used to indicate the profile, generally the external one, that is presented by a radial section of a lens (the terms—profile—and—external surface, or internal surface—may at times be used indifferently to express one and the same concept;

(v) the—base dioptric power—is used herein for what is also known as the neutral power or the value of the ametropia or the far vision power of the lens;

(vi) the diagramme in which the progression of the lens is to be represented has the distance from the centre to the periphery of the optical zone of the lens as its abscissa and the optical power of the lens as ordinate (it will be the diagram of a rotation figure around the centre of the lens);

(vii) the expressions—to see from close by—and—to see from far away—are simplified into respectively—for near vision—and—for far vision—.

The progression has the characteristic of presenting three tracts, each joined to its immediate predecessor: a) a first tract in which the lens functions for near vision, which commences from a peak at the centre to decrease very rapidly to the base dioptric power; b) a second tract in which the lens functions for far vision and remains substantially parallel to the abscissa at the level of the base dioptric power; c) a third tract comprising a first progressively increasing part and a second part parallel to the abscissa, corresponding to the powers at which the lens functions progressively in the first part for intermediate distances and in the second part in a constant manner for near vision.

It has been found that the first and the third tract, a) and c), separated by the second tract, b), influence each other and are both indispensable for furnishing an adequate vision for intermediate distances and for nearby.

It can be readily understood that the progression creates a series of concentric optical zones on the surface of the lens: a first central and circular zone and others in annular form of greater or lesser width in the radial direction, each of the latter obviously having equal optical characteristics throughout its radial and circular extension, and it can also be seen that, for each person suffering from a particular refraction status, the progression, though always characterized by the aforesaid three tracts, will have a peculiar pattern of its own, generally different from all others.

The lens of the invention can be either of the soft, hydrogel or rigid gas-permeable type.

BRIEF DESCRIPTION OF THE DRAWINGS

The invention will now be described in greater detail and making reference to the attached drawings, wherein:

FIG. 1 shows a logic scheme of the construction of the external surface of a lens;

FIG. 2 shows a diametral lens section associated with a schematic diagram;

FIG. 3 shows a first detailed diagram;

FIG. 4 shows a second detailed diagram; and

DESCRIPTION OF PREFERRED EMBODIMENT(S)

Figure 5:
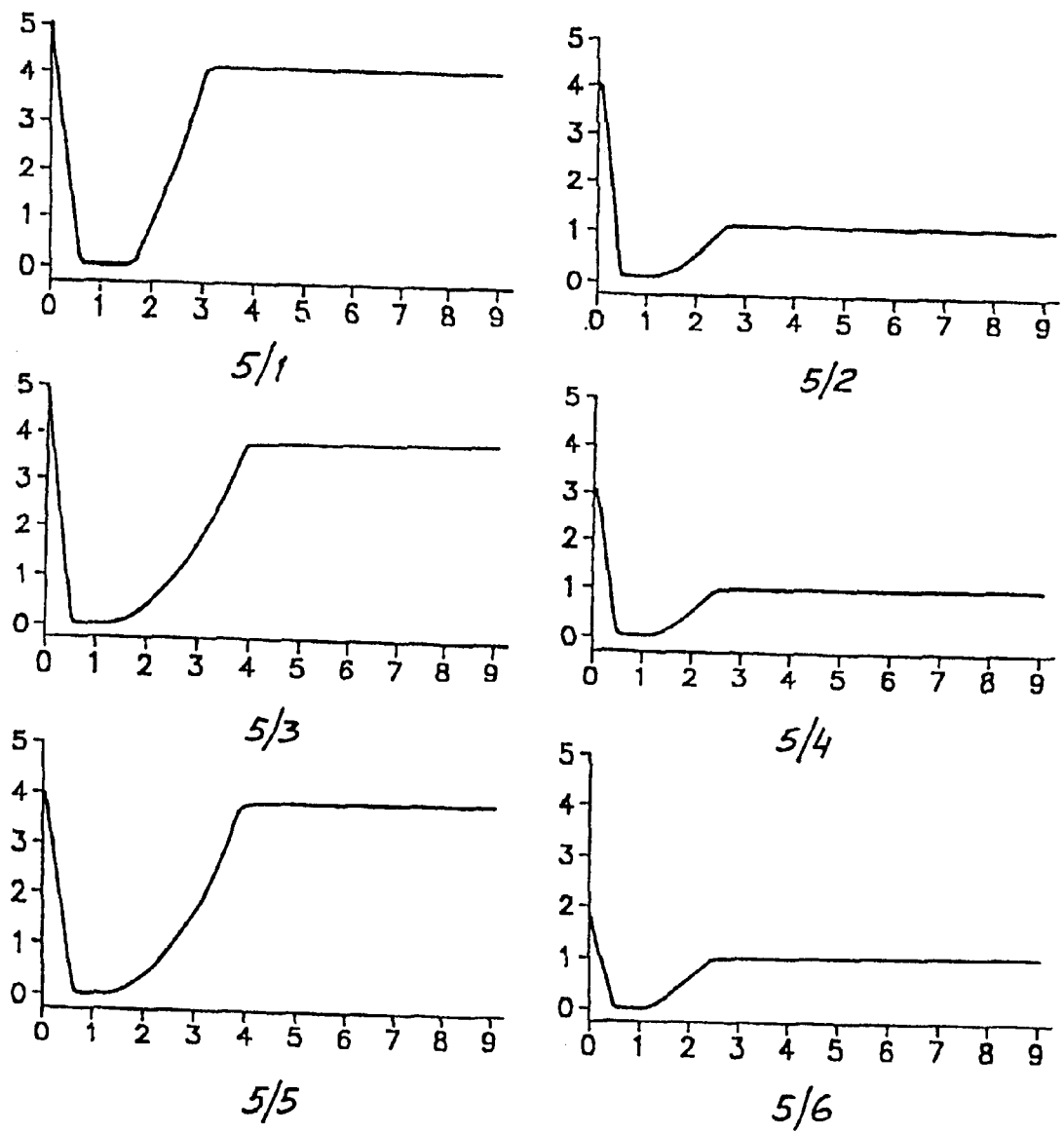
FIG. 5 shows a group of six diagrams.

FIG. 1 shows the succession of phases for arriving at the definition of a lens in accordance with the invention.

i) the choice of the base curve, or internal curve, that has to be adapted to each specific eye is determined by the application choices of the optometrist; since it constitutes a variable, as many radii of curvature are found as there are mathematically possible curves and it does not therefore constitute a characteristic property of the lens in question;

(ii) the base dioptric power of the lens is a function of the refraction status for far vision of the subject under consideration and, consequently, is once again not necessary for compensating the presbyopia;

(iii) having defined the base curve and, if necessary, also the base dioptric power, a particular power variation is imposed on the external surface of the lens and extending over the entire optical zone for the purpose of compensating the presbyopia. This power variation becomes translated into a continuous variation of the profile or external surface. Though using only one of the possible specific progressions (this condition will be more readily understood later on), as many profiles will be obtained as there are combinations deriving from the association of base curves and dioptric power for far vision. The progression determines the capacity of this lens of correcting presbyopia. Thus, the progression in the lens will be determined.

(iv) the progression is thus a function of the previously described elements; the possible combinations generate millions of profiles, all different from each other, and a given lens will be equal to another only if the constituent elements of both lenses (i.e. base curve, power for far vision, and power variation from which the external curve is obtained) are all identical. Realization of the external surface is obtained with a conventional machine suitable for processing contact lenses and controlled by an express computer program.

FIG. 2 shows the diametral section of a lens 1; the progressive variations of the profile of the lens are of the order of hundredths of a millimetre and take place every ten microns from the lens centre towards the periphery of the optical zone. These variations are impressed upon the lens in accordance with the following rule: for every small area from the centre of the lens, for every basic ray needed for the application of the lens to the eye and for every fraction of a dioptre for far vision starting from zero there first exists an aureole of circular form and then other aureoles of annular form, and the profile of each of these has a radius of curvature of its own; it is therefore readily apparent that the possible profiles of the lens according to the invention are unlimited; for this reason it is not realistic to try to represent any one of the profiles of the lens in a figure; what has rather been done here is to superpose onto the profile of the lens the schematized diagram of the progression in the form of—optical power/distance from centre—diagrame that guided the construction of the lens. The diagram applied to the lens profile shows in schematic form the three tracts a), b) and c) that characterize the progression. To the right of the lens 1 there is shown a series of points A on the optical axis I—I representative of the very large number of focalization points produced by the variable optical power of the lens. The fact that the progressive variations of the lens profile are microscopic ensures that the progression may be imparted onto the internal surface of the lens rather than its external surface; indeed, such microscopic variations do not disturb the surface of the cornea.

FIG. 3 shows a progression example in some detail, that is to say, one particular manner in which the optical power of the lens may vary between the centre of the lens and the perimeter of the optical zone; the tract a) has a peak about 5 dioptres at the centre of the lens and then descends rapidly to have its foot at the value of 0 dioptres, equivalent to the optical power for far vision, at a distance of 0.7 mm from the centre of tile lens; the tract b) is parallel to the axis of tile abscissa at the level of 0 dioptres and remains substantially constant from the foot of the tract a), i.e. from 0.7 mm to 1.8 mm from the centre of the lens; the tract c) consists of a first part c'), adjacent to tract b), which progressively rises from the aforesaid value pair 1.8 mm-0 dioptres to the value pair 3.0 mm-4 dioptres, and a second part c"), which remains substantially constant at the value of 4 dioptres for the whole of the remaining extension of the optical zone of the lens, i.e. from 3.0 to 9.0 mm.

FIGS. 4 and 5 show that the progression illustrated by FIG. 3 is nothing but a particular case of one of the families of progressions peculiar to the lens in accordance with the invention; FIG. 4 shows three parts a, b, c that indicate, respectively, the region of the diagram in which each of the tracts a), b), c) of the infinity of progressions may come to be situated. FIG. 5, on the other hand, shows six possible configurations (5/1–5/6) that may be assumed by the progression. This figure shows only the reference numbers on the axes of the abscissas and the ordinates, but does not identify the tracts a), b) and c), which are the same as those indicated in FIG. 3. The configurations reproduced in FIG. 5 show as many possible progressions as are comprised in the diagram of FIG. 4, which is not to be understood as limitative.

What is claimed is:

1. A progressive multifocal contact lens (1) suitable for compensating presbyopia, characterized in that the power of the optical zone varies continuously with respect to the base dioptric power between the centre of the lens and the periphery of the optical zone according to a progression presenting:—a peak at the centre, from which there departs a first tract (a) that rapidly descends to the base dioptric power and along which the lens functions for near vision,—an intermediate second tract (b) substantially parallel to the abscissa at the value of the base dioptric power and along which the lens functions for far vision,—a peripheral third tract (c) consisting of a progressively rising first part (c') and of a second part (c") parallel to the abscissa, said two parts (c', c") corresponding to the powers at which the lens functions progressively for intermediate distances in the first part and in a constant manner for near vision in the second part.

2. A progressive multifocal contact lens in accordance with claim 1, characterized in that:

the first tract (a) has a peak at the centre of the lens, which may have values up to about 6 dioptres, from which it descends to a value of 0 dioptres, the equivalent of the base dioptric power, at a distance from the centre of the lens that may range from 0.5 to 1.5 mm;

the second tract (b) is parallel to the abscissa at the level of 0 dioptres and remains substantially constant from the foot of the first tract (a) to a point of union with the lower end of the third tract (c);

the third tract (c) comprises:

i) the first part (c') that progressively rises from the point of union to a point situated at a distance from the centre of the lens between 2.5 and 3.5 mm and at a dioptric power comprised between 0.5. and 5.0;

ii) the second part (c") that remains substantially constant at the value of the dioptric power comprised between 0.5 and 5.0 for the whole of the remaining extension of the optical zone of the lens, from the aforesaid distances from the centre of the lens between 2.5 and 3.5 mm right through to the perimeter of the optical zone.

* * * * *